Dec. 27, 1938.　　　O. F. REITER　　　2,141,557
STONE PICKING MACHINE
Filed April 30, 1937　　　5 Sheets-Sheet 1

Fig. 1.

Inventor:
Otis F. Reiter,
By Spen Dunlap + Hall
Attorneys.

Dec. 27, 1938.   O. F. REITER   2,141,557
STONE PICKING MACHINE
Filed April 30, 1937   5 Sheets-Sheet 2

Dec. 27, 1938.    O. F. REITER    2,141,557
STONE PICKING MACHINE
Filed April 30, 1937    5 Sheets-Sheet 3

Inventor:
Otis F. Reiter,
By Spear, Donaldson & Hall
Attorneys.

Patented Dec. 27, 1938

2,141,557

UNITED STATES PATENT OFFICE 2,141,557

STONE-PICKING MACHINE

Otis F. Reiter, Baltimore, Md., assignor to Fastpic Corporation, Baltimore, Md., a corporation of Maryland Application April 30, 1937, Serial No. 140,062

30 Claims. (Cl. 55—17)

The invention concerns apparatus for picking up stones for clearing ground, in the making of roads, or improving farm land and for like purposes. The improvements forming the subject matter of this specification and appended claims involve various features relating to the picking up mechanism, means for carrying the stones from one part of the machine to another part for their delivery, drive connections for operating parts of the machine to perform the picking up actions and delivery actions.

The invention also concerns dumping mechanism by which a receptacle movably mounted on the gathering machine, and under the control of the operator is displaceable by certain mechanism to carry the receptacle to a point at which the receptacle is dumped to deliver the stones or other material therefrom.

The machine comprises carrying wheels 1 mounted on an axle 2, supported in a main frame 3. In front of this axle there is mounted on the supplemental frame 3a hereinafter referred to a reel 4 having picker arms or tines 42 which co-operate with a rake organization 5, 5a having teeth 6 which take the stones from the ground to be contacted by the lifting arms or tines and carried forward thereby along the track or conveyor bars 7 which are spaced apart from each other and which deliver the stones into the receptacle indicated generally at 8. This receptacle is pivotally mounted at 9 in arms 10 which extend rearwardly from the receptacle located in front of the reel and conveyor bars, the said arms 10 being pivotally mounted on the axle 2 to move about said axle in a vertical plane so that when the dumping operation is to be performed, the arms 10 are lifted to the position shown in dotted lines at x and in which position a door 11 of the receptacle is operated to open the rear side of the receptacle for the discharge of its contents to the rear of the machine, the receptacle being then in the inclined position shown in dotted lines at 8a in an elevated position in Fig. 1.

The arms 10 are lifted by power mechanism under the control of the operator, and in the form of the invention illustrated herein as an example of one embodiment of my invention, this power mechanism is of a hydraulic character and includes a cylinder 12 pivotally mounted at 13 in brackets 14 fixed to the main frame 3, the said cylinder containing a piston or ram member pivotally connected to the arm 10 at 15. Pressure fluid from a hydraulic pump 16 is delivered to the cylinder 12 through a flexible hose or pipe 17 and the passage of fluid through this pipe or hose from the pump is controlled by any suitable valve mechanism which may be located in the hydraulic pump unit 16, this valve mechanism needing no specific description other than to indicate that it has a valve member to control the inlet of fluid to the hydraulic cylinder 12 and also a valve member to control the discharge of fluid from said hydraulic cylinder to the hydraulic pump unit.

Figure 1:
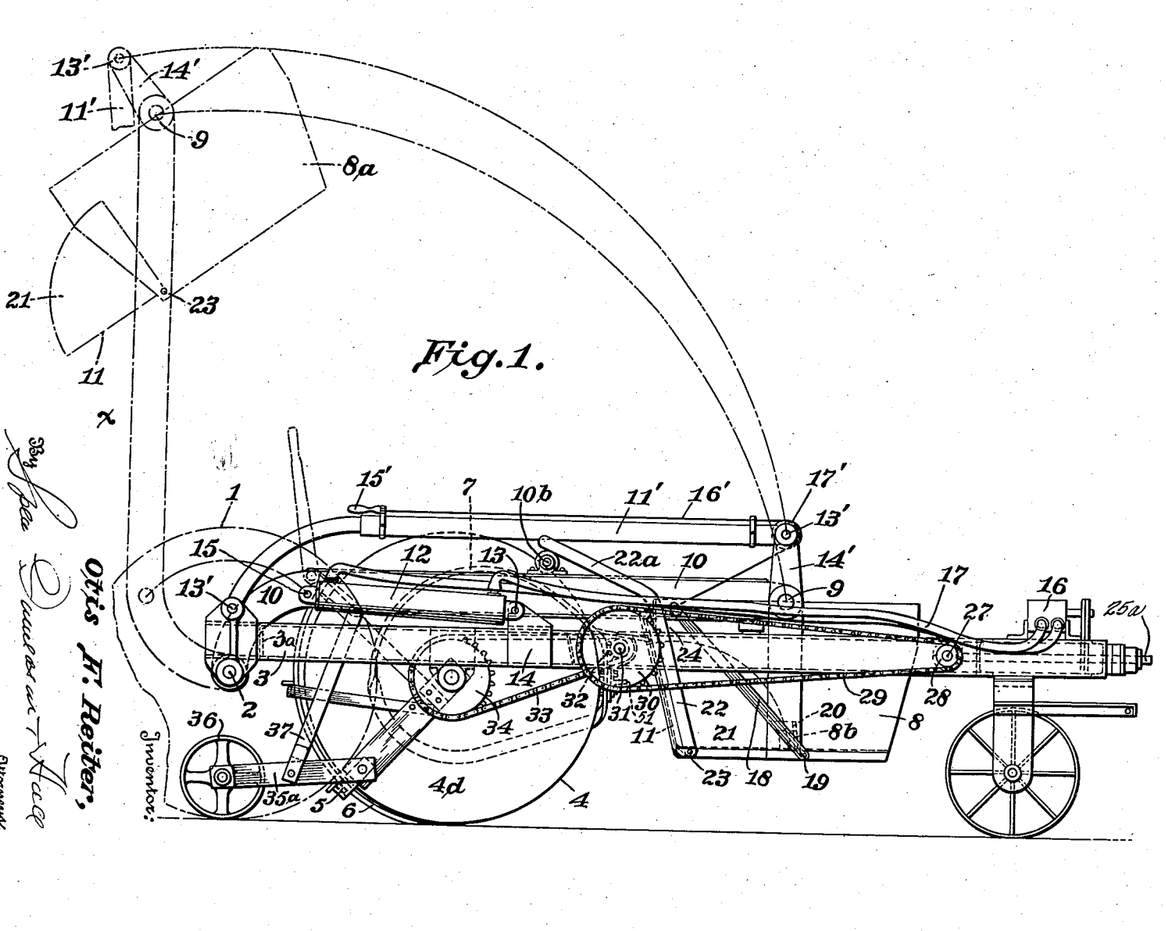
Figure 1 is a side view of a machine embodying the invention.

When the receptacle 8 has received the desired amount of stones or other material, the operator by operating the valve mechanism causes the pump to deliver the hydraulic fluid into the cylinder 12 and thereupon the ram or piston in said cylinder operates to raise the arms 10 from the substantially horizontal position shown in Fig. 1 to the elevated position shown by the dotted lines at x.

Figures 3, 4:
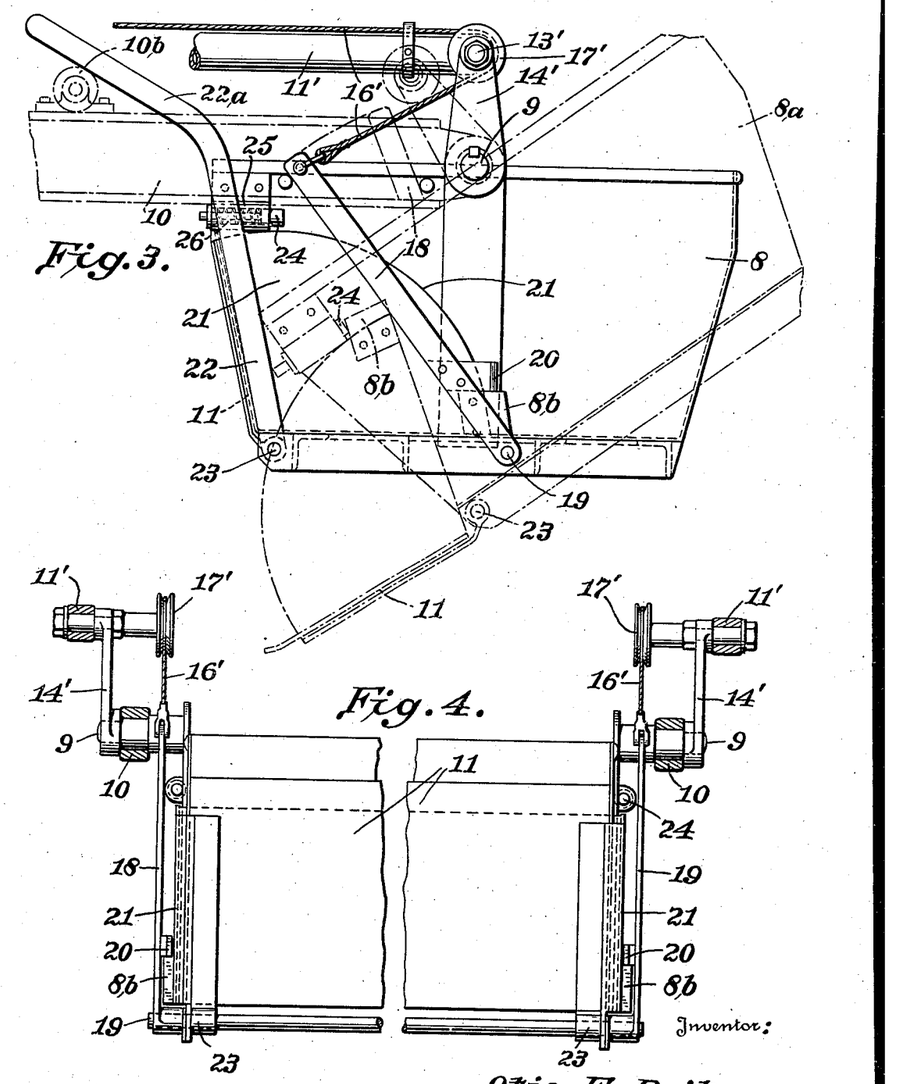
Fig. 3 is a side view of the receptacle into which the stones are deposited.
Fig. 4 is a rear view of said receptacle.

As the receptacle 8 rises to its uppermost position it is tilted about its pivot 9 into the position indicated by the dotted lines, that is, inclining backwardly and downwardly. This inclined position is assumed because of the connection 11' consisting of a rod pivotally mounted on the main frame at 12' and pivotally connected at 13' to the upper end of an arm 14' fixed to the side of the receptacle 8. When the receptacle has arrived at the elevated position and inclining downwardly and rearwardly, the operator by pulling upon a handle 15' draws upon a flexible cable 16' which passes around a pulley 17' to the upper end of a lever 18 pivoted at 19 to the outer side of the receptacle 8. This pivoted lever 18 carries a catch 20 contacting with an abutment 8b on the side 21 of the door 11 pivotally connected at 23 to the bottom frame of the receptacle 8 so that when the handle 15' above mentioned is operated the catch 20 is removed from contact with the abutment 8b of the side of the door, and said door then under the weight of the material resting thereon will open for the discharge of the material into a pile at the rear of the machine or into any suitable truck to be carried away. This opening movement of the door 11 is cushioned by a spring pin 24 Fig. 3 in a housing 25 attached to the side of the receptacle 8, said pin being under tension of a spring 26 in the housing. The spring pin 24 is contacted by the abutment 8b on the side of the door when said door has reached its open position inclining downwardly and backwardly as shown in dotted lines in Fig. 3.

After the discharge of the material has taken place the receptacle 8 will be restored to its normal position at the front of the mechanism which picks up the stones from the field and delivers them in a forward direction into the receptacle. The door 11 is restored to its normal closed position when the receptacle 8 reaches the lowermost limit of its movement by an arm 22a on the door contacting an abutment, preferably in the form of a roller 10b on one of the arms 10. The lowering movement of these arms, together with the receptacle or bucket will be effected under the control of the operator by relieving pressure in the cylinder 12 so that the ram or piston may restore to its normal position.

The hydraulic system may be of any known variety either single acting or double acting, that is to say, in the single acting arrangement hydraulic fluid would be admitted to one end of the cylinder to act upon the ram or piston for raising the arms 10 and in order to lower the arms it would be necessary only to release the pressure from the end of the cylinder, whereas in the double acting system hydraulic fluid would be admitted at one end of the cylinder for lifting the receptacle, and admission of said hydraulic fluid to the opposite end of the cylinder would be utilized for assisting in the lowering operation of the receptacle. This hydraulic system in its detail forms no part of the present invention, these details being well-known to those skilled in hydraulics.

In order to drive the reel or drum 4 which carries the tines for lifting the stones and depositing them on and moving them along the conveyor or track bars 7 for delivery to the receptacle 8, I employ a shaft 25a suitably mounted in the frame and operated from a power unit on the tractor which is hitched to the forward end of the frame of the apparatus. This shaft through beveled gearing 26 drives a transverse shaft 27 extending to one side of the frame of the apparatus for driving a chain wheel 28 which through a chain or belt 29 drives a sprocket wheel 30 on a shaft 31, suitably mounted in the frame, and having a sprocket wheel 32 thereon, which through a sprocket chain 33 drives a sprocket wheel 34 on the shaft of the reel or drum carrying the tines or arms 42 for picking up the stones. It will be noticed that the transmission from the shaft 25a extending along the center line of the apparatus at the front of the frame thereof takes place in a circuitous course involving the transverse shaft 27 and the sprocket wheels and chains mentioned above located off to one side of the frame of the apparatus so that the space immediately in front of the drum or reel carrying the picker fingers or tines 42 is left available for the location of the receptacle 8 immediately adjacent the forward side of the reel or drum. It will be noticed also that the delivery of the materials collected in the receptacle 8 takes place to the rear of the machine by the upward and backward movement of the said receptacle as described above, though this part of the invention is not limited in this respect.

Figure 7:
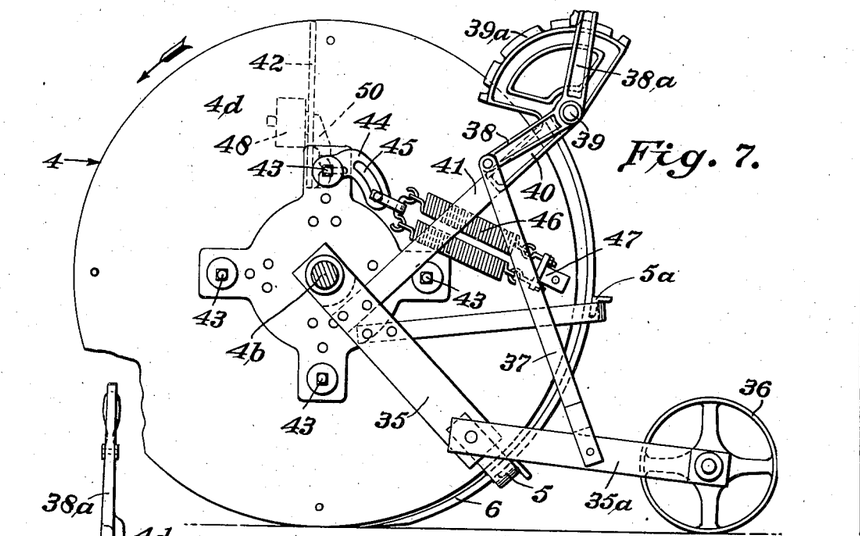
Fig. 7 is a side view of the reel and rake teeth.

Referring to the construction and arrangement of features directly associated with the rake teeth, the reel and the track or conveyor bars for picking up the stones and carrying and guiding them to the point of delivery at the hopper 8, it will be seen from Fig. 7 that the rake teeth 6 are supported at two points by the bars 5, 5a. The bar 5 is supported by arms 35, one at each side of the reel pivotally hung on the shaft 4b thereof, which shaft is supported in bearings 4c, which, in turn, are supported by the supplemental frame 3a. A ground roller or drum 36 is journaled in arms 35a, pivotally mounted at the rear ends of the arms 35, and an operating bar 37 extends from the arm 35a to the lever arm 38 pivoted at 39 to a bracket 40 which is attached to a support 41 fixed to the arm 35. The lever arm 38 is operated by a hand lever, part of which is shown at 38a in Fig. 7.

A segment 39a is formed with the bracket 40 and is engaged by a pawl, as in common practice, mounted on the hand lever, so that by operating the hand lever, together with the usual pawl operating connection, the ground wheel or drum 36 can be set to regulate the position which the rake teeth will assume relative to the surface of the ground for picking or digging up the stones.

The rake teeth are located in rear of the reel and are spaced apart laterally so that dirt may fall between them as the stones are raised by the lifting arms or tines 42 carried by the reel 4. This reel is composed of side plates 4d in the form of discs mounted to turn with the shaft 4b. Rock shafts 43 span the space between these side plates and are journaled therein. The shafts carry the stone lifting arms or tines 42, which engage the stones and lift them along the rake teeth and deposit them upon the track or conveyor bars 7, along which the stones are pushed towards the front of the machine by the lifting arms travelling in the direction of the arrow, Fig. 5, until they reach such a position that they will pass by gravity to be discharged at the front of the reel into the hopper 8. In other words, and referring to Fig. 5, the conveyor or track bars 7 curve upwardly from the rear side of the reel to the point y and thence they extend downwardly to the point z, where the stones leave them to be deposited into the hopper, having acquired sufficient speed to pass across the space intervening between the ends of the conveyor bars and the interior of the hopper. The cross shafts 43 are in the form of T bars with cylindrical journals at their ends mounted in the bearings of the side plates or ends of the reel. At each outer end of each shaft that is on the outer side of each disc or plate 4d of the reel there is fixed an arm 44 provided with a curved slot 45 receiving a projection or roller 45b from a link or strap 45a to which is connected either one or a pair of helical springs 46. These springs at their outer ends are connected to the disc 4d of the reel by suitable hook bolts 46a and bracket 47. These springs are in the aggregate strong enough to hold the stone lifting arms 42 to their work in raising the stones along the rake teeth and carrying them to the highest portions of the track or conveyor bars 7, i. e., at y, but should these lifting arms encounter extraordinary resistance as by contacting a boulder, the springs will allow the arms to yield and ride over the obstruction, and when the obstruction is passed, the springs will return the arm to its original position for normal operation again. For each shaft 43, each of which carries a series of these lifting arms, spaced apart laterally of the reel to accord with the spacing of the rake teeth, there is a shock absorber or yielding stop for each end of the shaft, consisting of a housing 48 secured to the inner face of each of the discs or side plates 4d of the reel, each housing having a stop member 49 backed by a spring 50a or rubber block so as to cushion the shock when the lifting arm 42 snaps back to normal working position after having yielded upon contacting the obstruction, and after having passed said obstruction.

It is the lifting arms at the end of the series strung along the shafts that have to sustain the shock in hitting the spring cushion stops 49, it being understood that all the lifting arms of any one set are fixed to the T iron shaft member 43 which carries them, so that cushioning the return of the end arms of any one set will cushion the return of the whole set of lifting arms. In order to enable the end lifting arms of each set to sustain the shock of the stopping action, a bracing arm 50 is cast with each rock shaft and backs up and reinforces the end one of the lifting arms 42 and extends along and in contact therewith a sufficient distance to resist breakage when the arm hits the stop 49, and as this stop is yieldable this circumstance, together with the sustaining effect of the reinforcing arm 50 will insure the capacity of the lifting arm to perform its stopping function without breakage. When one of the lifting arms contacts an obstruction which it cannot dislodge or lift, the whole set of arms on the same shaft with the contacting arm will be arrested to accord with the arrest or yielding action of the particular arm which contacts the obstruction, but none of the other arms will lose control of the stones which they individually are contacting, but they will simply rest together with the arm which has hit the obstruction until the obstruction is passed, whereupon they will resume their lifting functions to raise all the stones that they started to lift.

Reverting to the action of the slotted arm 44 and the spring or pair of springs 46, the purpose of the slot is to prevent undue strain being imposed on the springs in the event that the arm is moved to an excessive extent, if the lifting arm 42 of the reel encounters an extra large boulder, and is given excess movement in the act of passing the same. Should this happen and the arm 44 be moved to an excessive degree, the slot will assume such a position relative to the longitudinal axis of the springs that the pin or roller 45b connecting the pair of springs with the slotted arm, will slip along the slot towards the shaft 43 and thus strain on the springs will be relieved, thus avoiding stretching them to such an extent as will result in damage thereto.

The lifting arms 42 of the reel are spaced apart along their respective carrying shafts a sufficient distance to alternate in position with the track or conveyor bars 7. That is to say the lifting arms move in the spaces between the conveyor bars 7. They work in the same vertical planes with the rake teeth. Therefore, the rake teeth are in vertical planes alternating with the vertical planes in which the conveyor bars 7 lie.

Figure 8:
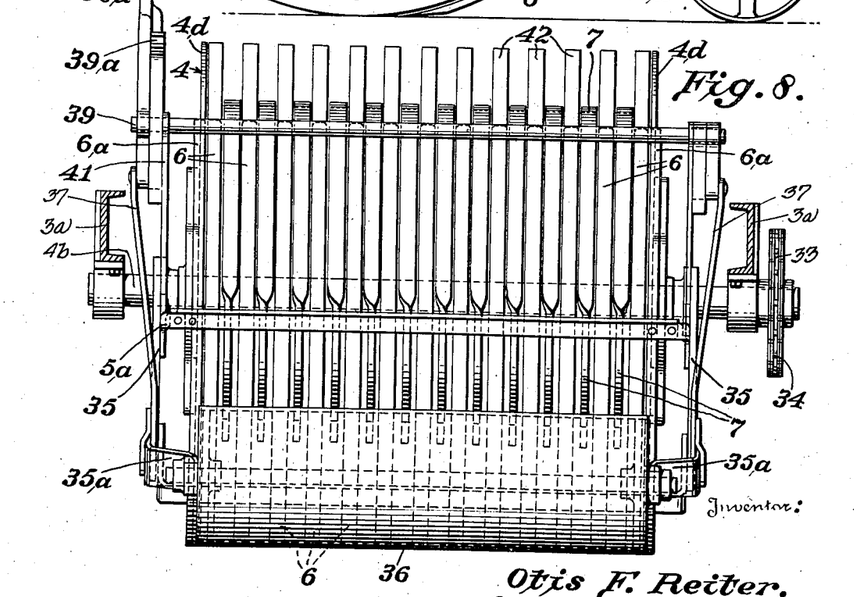
Fig. 8 is a rear view of the reel, rake teeth and conveyor or track bars.

The lifting arms at the ends of the series operate close to the inner sides of the discs or side members 4d of the reel so that jamming of stones between the side edges of these arms and the discs will not occur. Furthermore, the rake teeth at the end of the series of such teeth are specially made or arranged to prevent the jamming of stones between the side plates or discs of the reel 4 and the rake teeth. For this purpose an extra rake tooth may be employed at the extreme outer ends of the series of rake teeth as indicated at 6a Figs. 2, 8 and 9, so that this tooth will extend across and laterally beyond the edge of the disc. Thus no such appreciable space will be left between the tooth and the edge or inner side of the reel side plate 4d within which a stone can lodge and cause damage. Instead of an extra tooth 6a the end tooth 6 of the series may be made extra wide to extend across the edge of the disc. This in effect would be the same as making the tooth portion 6a in one piece with the end tooth 6.

Figures 5, 6, 11:
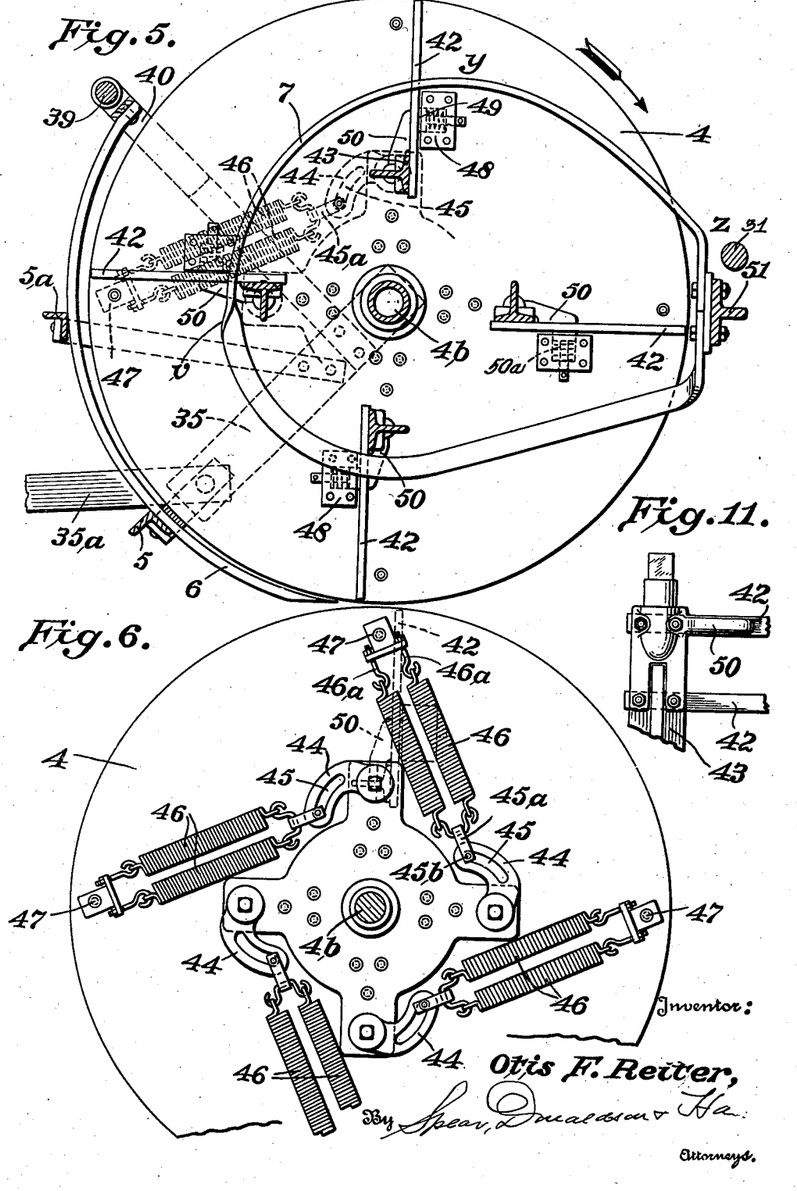
Fig. 5 is a view in section of the reel having lifting arms, and showing in side elevation conveyor or track bars for directing the stones to a point of delivery when advanced by the lifting arms.
Fig. 6 shows a side elevation of the reel with springs connected with the shafts mounting the lifting arms and associated connections.

The track or conveyor bars 7 are formed each in one piece of flat metal twisted at V Fig. 5 so that the upper stretches of said bars lie in a horizontal plane to provide a platform on which the stones may move while the lower sections of said bars lie flatwise in vertical planes. This formation adds strength to the bars and brings the edges of their upper sections comparatively close together to make narrow guide slots in which the stone lifting and propelling arms 42 travel. These conveyor or guide bars along which the stones are caused to travel are supported only at their front ends, as shown in Fig. 5, where said ends are bolted to a cross beam 51 of the supplemental frame 3a of the machine. These track way or conveyor bars are not supported at their rear portions so that they are capable of flexing laterally slightly to accommodate themselves to any irregularity in their forms, or in the lifter arms 42.

The conveyor bars are connected with the cross beam which is in front of and spaced apart from the front edges of the discs comprised in the reel, and hence beyond the circular path of travel of the lifter arms 42 so that there will be no danger of said arms striking the beam or the ends of the conveyor bars attached to such beam. At the rear, however, the conveyor bars lie between the discs and hence they are here at a less distance from the center of rotation of the reel than the location of the major portions of the lifter arms in relation to the reel axis, but as the spaces between the said conveyor bars are open at the rear, the lifter arms can travel around with the reel without being interfered with by any part of the conveyor bars.

By forming the conveyor bars 7 with the twist at V the lower portions of the bars are set up vertically on edge to provide stiffness against sagging down and also to provide ample clearance space between them through which dirt may drop through instead of lodging thereon, and, at the same time, the upper portions of these bars are spaced with their lateral edges close enough to afford platforms for the conveyance of the stones upon the flat surfaces of these bars.

It will be noted that the reel is driven from a power unit mounted on the frame or on a tractor which draws the frame along. This is an advantage over driving the reel from the traction wheels of the apparatus because the speed of the reel will not be dependent upon the speed at which the machine advances over the ground being operated upon.

Figures 2, 9, 10:
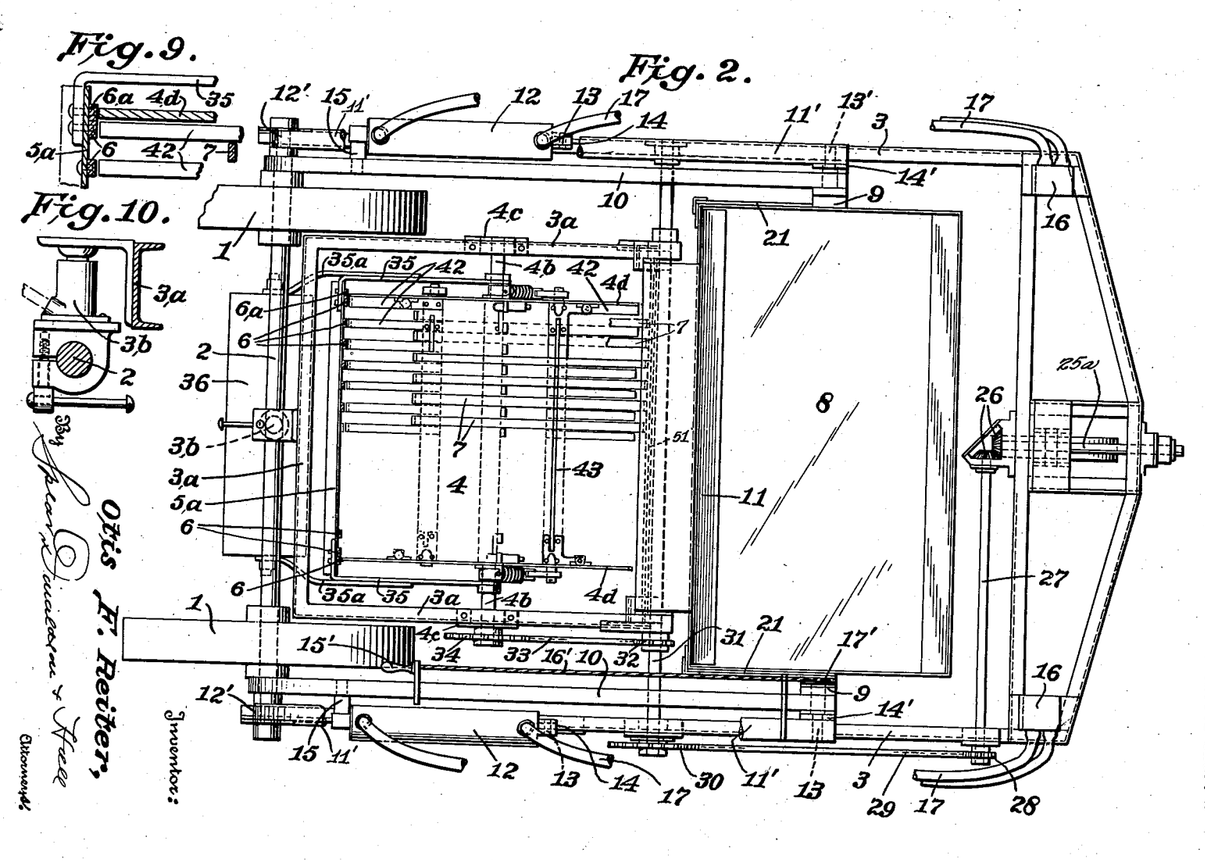
Fig. 2 is a plan view of Fig. 1.
Figs. 9, 10 and 11 are views of details.

The supplemental frame 3a carrying the reel 4 is pivotally mounted at its front end to turn about the shaft 31 and at its rear portion said supplemental frame can be raised or lowered by any suitable form of lifting jack indicated generally in the plan view Fig. 2 at 3b. By this arrangement the reel can be raised or lowered relative to the ground while the apparatus is being transported from one point to another without operating the stone gathering and lifting means.

It will be observed that the rake teeth are curved, and while they afford means for guiding the stones as they are elevated by the lifting arms of the reel, they are not concentric with the circular path of movement of the lifting arms. On the contrary, they diverge upwardly relative to said path, so that if any stone is caught between the end of the lifting arm and the rake tooth with which said arm is in alignment, the stone will be freed as it moves upwardly because of the divergent relation of the rake tooth to said path of movement of the lifting arm.

I have used the term "stone" in this description and in the claims for convenience, it being understood, however, that objects other than stones may be picked up by the apparatus.

Reverting to the yieldable conveyor or directing bars 7 which are supported at their forward ends only and are therefore free to yield at their other parts in rear of this front support, it will be noticed that these bars form a grating located in the space between the side discs or members 4 and that this space is entirely free excepting for the rock shafts 43 which carry the lifting arms and except for the lifting arms themselves, with their shock absorbers which in part are arranged close to the inner faces of the side members or discs, therefore stones or other material being pushed along these conveyor bars which drops through them, will drop through the free space within the circuit of the said loop shaped bars, and when they reach the lower stretches of these bars, i. e. the portions thereof below the level of the axis of the reel, will pass between these lower stretches because of their wider spacing relative to the spaces between the upper stretches, and thus will drop onto the ground and no jamming will take place and no collection of such material will occur on the lower stretches of the said conveyor bars. Having reached the ground they will be picked up again by the lifting arms with the possibility of their proper delivery the second time owing, for instance, to their changed positions. This will occur in the case of stones of more or less flat form. Furthermore, by reason of the free space just mentioned within the circuit of the conveyor bars there will be no chance of stones or other material lodging within the conveyor bars and interfering with their yielding actions, particularly in a vertical plane.

I claim:

1. A machine of the class described comprising a frame and carrying wheels, mechanism for picking up stones from the ground and delivering them to a point at the front of the machine, a hopper for receiving the stones at said point, arms in which said hopper is supported pivoted on the frame and swingable upwardly to a delivery point over the ground dumping doors carried by the body of the hopper, a power unit and connections for operating the said swinging arms, and means for operating the dumping doors of the hopper when said hopper is in its elevated position, substantially as described.

2. In combination in a stone picking machine, a reel composed of side members of substantially circular form, stone lifting arms pivotally mounted between the side members of the reel, a rake located in rear of the reel comprising spaced apart teeth curved in substantial conformity with the periphery of the reel, and having lower ends to engage and dislodge the stones to be taken by the lifting arms, certain of the rake teeth being next to the side members of the reel and extending across the edges of said side members preventing jamming of the stones between said teeth and thereby the said side members of the reel, substantially as described.

3. In combination in a stone picking machine, a reel comprising disc-like side members, a rotary shaft on which said side members are mounted to rotate therewith, cross shafts extending between and mounted on the rotary side members and having spaced apart stone lifting arms thereon, spring members connected with the cross shafts and with the rotatable side members on the outer side of said members for applying tension to the cross shafts, and shock absorbers mounted on the inner sides of said side members to cushion the shock of the lifting arms upon release from contact with the obstruction, and means for supporting the reel, substantially as described.

4. In a stone picking machine, a reel composed of disc-like side members spaced apart, a shaft about the axis of which the said side members rotate, means for supporting said shaft, rock shafts mounted in the side members of the reel and extending across the space between said side members, arms spaced apart and carried by the said rock shafts, a spring for each rock shaft applying tension thereto a set of said arms fixed to each rock shaft to move therewith as one body, and a shock absorber adjacent the end of each rock shaft acting as a stop to limit the returning movement of the shaft with all the lifter arms carried thereby after any one of said lifter arms of said shafts have contacted with and passed an obstruction.

5. In a stone picking machine, a reel composed of disc-like side members spaced apart, a shaft about the axis of which the reel rotates, means for supporting said shaft, rock shafts mounted in the side members of the reel and extending across the space between said side members, each rock shaft having arms spaced apart and fixed thereto, a spring for each rock shaft applying tension thereto, and a shock absorber adjacent the end of each rock shaft to act as a stop to limit the returning movement of said rock shaft with the lifter arms fixed thereto after any of said lifter arms have contacted with and passed an obstruction, and a reinforcing arm for and connected with each rock shaft and engaging the end one of the series of lifter arms on said rock shaft adjacent the part of said lifting arm which engages the shock absorber to brace the same and to prevent breakage of said end lifter arm when contacting with the shock absorber.

6. In combination in a stone picking machine, a frame, and a reel supported in said frame to have rotary movement, said reel being composed of disc-like side members spaced apart and having inner sides facing each other rock shafts rotatably mounted in said side members and extending between them, a series of lifting arms fixed to the rock shafts to contact with the stones, springs for applying tension to said shafts allowing them to yield when any one of its arms meets extra resistance, and shock absorbers at the inner side of the side member of the reel one for each rock shaft in the path of the end one of the series of lifting arms mounted on said rock shaft to provide a cushion for the end lifting arm on its release upon passing an obstruction.

7. A reel for stone picking machines composed of side members spaced apart, shafts extending between the side members and journaled therein, stone lifting arms mounted on said shafts, slotted lever arms connected with the ends of the shaft, and a pair of springs for applying tension to said lever arms, there being a pair of springs for each of said lever arms, said springs of each pair being parallel to each other and a connection common to both springs of each pair slidable in the slotted lever arm substantially as described.

8. A reel for stone picking machines comprising a pair of side members spaced apart, a shaft upon which said side members are mounted, shafts extending between the side members and rotatively mounted therein, each shaft having fixed thereto a plurality of spaced apart arms for lifting stones or the like, spring means mounted on the outer sides of said side members, a lever arm mounted on the end of each of the lifter arm carrying shafts on the outer sides of said side members, a connection between the spring means and the said lever arms automatically shiftable when the lever arms have an excessive throw due to excessive yielding movement of the lifter arms upon meeting an obstruction, a resilient shock absorber mounted on the inner side of a side member of the reel to be contacted by one of the lifting arms, and a reinforcing arm or brace mounted on the cross shafts projecting from the rock shafts and engaging and backing up the lifting arm along that portion thereof which contacts with the shock absorber.

9. In combination with a reel of a stone picking machine comprising side discs and a frame in which said reel is rotatively mounted, a shaft about the axis of which the reel turns shafts carried by the reel rotatively, arms mounted on the shafts for picking up the stones, said stone picking arms being spaced apart, conveyor bars connected with the frame at their front ends, and lying midway between the paths described by said arms, and with their side edges equally spaced from the center line of said paths, a rake in rear of the reel to dislodge the stones, said rake comprising spaced apart bars extending upwardly from the ground, said conveyor bars at their trailing portions directed towards the rake bars being free from support and thereby yieldable, said conveyor bars lying between the side discs, substantially as described.

10. Apparatus according to claim 9 in which the conveyor bars are composed each of a member in the form of a loop, encircling the reel shaft the rear portion of the loop between said side discs lying close to the path described by the shafts of the arms revolving about the center of the reel and with the front portion of said loop lying between the said side discs and extending away from said path of the shafts, substantially as described.

11. In combination with a reel of a stone picking machine having stone lifting arms spaced apart from each other, conveyor bars having portions above, in rear of, and below the axis of the reel and between which the lifting arms project, said conveyor bars having their upper portions lying with their edges directed laterally of the reel, and stone contacting surfaces facing outwardly in relation to the axis of the reel, the lower portions of said bars being disposed each with its side faces lying in vertical planes.

12. Apparatus according to claim 11 in which the conveyor bars are formed of flat metal pieces twisted intermediate of their length to provide the upper and lower portions, the surfaces of the upper portions which receive the stones facing mainly upwardly and the flat surfaces of the lower portions facing laterally towards the outer sides of the apparatus.

13. In apparatus of the class described, a main frame, carrying wheels therefor, a reel having means for picking up stones and delivering them towards the front of the machine in front of the reel, a supplemental frame pivotally mounted at its front end on the main frame, said reel being mounted on said pivotally mounted supplemental frame, and means at the rear end of the supplemental frame for lifting it relative to the main frame, rake teeth for engaging and lifting the stones to be taken by the reel to be transported thereby, means for supporting said rake teeth on the reel shaft to be adjusted about the axial center thereof, and means for adjusting said rake teeth, relative to the reel substantially as described.

14. In combination with a reel having means to lift stone comprising lifting arms, a rake unit having rake teeth for gathering said stones to be lifted by said lifting arms, said rake unit being pivotally mounted on the shaft of said reel, a ground roller, a support therefor connected with said rake unit adjustably, manually operable means on the rake unit for adjusting ground roller to adjust the rake teeth in relation to the ground, said manually operable means comprising a shaft mounted in said rake with a hand lever on said shaft and a connection between the hand lever and the ground roller support, and means also mounted on said rake unit for holding the hand lever in adjusted position, substantially as described.

15. In combination in a stone picking machine, a frame, carrying wheels therefor, a reel mounted in the frame having means to lift the stones, and discharge them at the front of said reel, a hopper supported by the frame directly adjacent the front of said reel to receive the stones immediately therefrom, and power operated connections for driving the reel independent of the carrying wheels, substantially as described.

16. In apparatus of the class described, a main frame, carrying wheels therefor, a reel having means for picking up stones and delivering them towards the front of the machine in front of the reel, a supplemental frame pivotally mounted at its front end on the main frame, said pivotal mounting consisting of a cross shaft mounted on opposite sides of the main frame said reel being mounted on said pivotally mounted supplemental frame, and means for lifting the supplemental frame at its rear end relative to the main frame, rake teeth for engaging and lifting the stones to be taken by the reel to be transported thereby, means for supporting said rake teeth on the reel shaft to be adjusted about the axial center of said shaft, means for adjusting said rake teeth, and power operated means for driving the reel, said power operated means connecting with the shaft first mentioned and a drive connection from said shaft to the reel shaft, substantially as described.

17. Apparatus according to claim 13 having power driving means for the reel extending from a point in front of the reel, first lengthwise of the machine, thence laterally thereof, and then longitudinally at the side of the machine to the reel shaft, thereby leaving space in front of the reel to be occupied by a hopper, and a hopper located in said space substantially as described.

18. In combination in a stone picking machine, a main frame, carrying wheels mounted in said frame and arranged at the rear end thereof, a shaft mounted in the frame in advance of the carrying wheels, a reel mounted on the last mentioned shaft, a rake mounted towards the front of the machine in respect to the carrying wheel shaft, and in rear of the reel shaft, lifter arms carried by the reel, conveyor bars arranged within the reel and supported on the main frame with which the lifter arms cooperate to direct the stones to the front of the machine from the rake teeth, and a power unit mounted on the main frame with connections therefrom for driving the reel shaft, substantially as described.

19. In combination in a machine for picking stones and the like, a frame work, an axle mounted thereon, carrying wheels on the axle, a rake, a second axle, a reel mounted on the second axle comprising a pair of discs, spaced apart a distance less than that of the carrying wheels and of a diameter substantially equal to that of the carrying wheels, with the lower parts of their peripheries substantially at the ground line, lifting arms on said reel between the discs thereof for elevating stones dislodged by the rake, conveyor bars between the discs receiving the stones from the lifting arms, a power shaft mounted on the frame and connections from said power shaft to the second axle for rotating the reel, substantially as described.

20. Apparatus according to claim 19 in which the carrying wheels are located in rear of the reel and rake, substantially as described.

21. Apparatus of the class described comprising means for picking up and delivering stones, a wheeled carrying frame on which said means is mounted, a hopper in front of said means for receiving the stones delivered thereby, upwardly swinging supports pivotally mounted on the frame and carrying said hopper, and means for swinging said supports for carrying the hopper to a point for dumping material at an area of the ground not to be subsequently traversed by the further forward movement of the machine, substantially as described.

22. A machine of the class described comprising a frame, carrying wheels, a reel for elevating stones from the ground and moving them forwardly of the machine, a hopper normally in front of said reel to receive the stones, supporting means for the hopper, pivotally mounted on the frame and swingable upwardly and rearwardly relative to the reel to carry the hopper to a point over the ground in rear of the machine, and means for dumping the hopper.

23. In combination in a stone picking machine, a frame, carrying wheels therefor, a reel having stone lifting arms and rotatively mounted in the frame, a rake having teeth curving upwardly and gradually diverging rearwardly from the circular path of movement of said lifting arms, shafts rotatively mounted in the reel and each carrying a series of said lifting arms to move therewith as one body, and means for yieldingly stressing said shafts to return them with the series of arms carried thereby after passing an obstruction, substantially as described.

24. In combination a frame, stone lifting means rotatable about a horizontal axis, and comprising spaced apart arms, and spaced apart bars for directing the stones as propelled by said arms about said axis, and between which bars the lifting arms travel, said bars being each in the form of a loop encircling said axis, supporting means for the said bars located only at their front ends leaving free from support all other points to yield laterally and vertically, each of said lifting arms normally describing a circular path wholly in rear of said supporting means, substantially as described.

25. In combination in a stone picking machine, a main frame, a supplemental frame pivotally connected to the main frame at its front end, a shaft mounted on the supplemental frame, a stone lifting reel mounted on said shaft, a rake in rear of the reel for engaging and lifting stones to be taken by the reel, means for supporting the rake from the shaft on which the reel is mounted, means for adjusting the rake about said shaft, means for adjusting the supplemental frame about its pivotal mounting and means for driving the reel, substantially as described.

26. A machine for picking stones and the like according to claim 23, in which the rake teeth are in alignment with the lifting arms.

27. Apparatus according to claim 2 in which the said teeth diverge upwardly slightly from the circular paths described by the lifting arms and from the circular edges of the side members.

28. In apparatus of the class described, a frame, means for lifting stones comprising lifting arms revolving about a common axis, means for supporting said arms, conveyor bars mounted at their forward ends only, on the frame, leaving their portions in rear of said supported front ends free to yield vertically, said conveyor bars being spaced apart for the movement of the lifting arms between them, said conveyor bars each having an upper stretch above said axis and a lower stretch below said axis connected together in rear of said axis, the space between the upper and lower stretches of said bars being free for material passing between the upper stretches to fall to and pass between the lower stretches to the ground, substantially as described.

29. Apparatus of the class described comprising a carrying frame, adapted to have forward travelling movement, lifting arms on said frame revolving around a common axis, yieldable conveyor bars betwen which the lifting arms travel, each of said bars being of substantially loop form having their rear portions comparatively close to said common axis and their forward portions progressively increasing in distance from said axis, with means at only the front portion of said loop for supporting the convergent ends thereof, leaving the parts of said loop in rear of said supporting means free to yield, said supporting means being outside the normal circular path described by the outer ends of the lifting arms so that said lifting arms in their revolution will gradually recede within the grating formed by the conveyor bars and will pass the said supporting means while maintaining their normal substantially radial position relative to said axis, and rake teeth supported in rear of and spaced apart from the yieldable rear portion of the conveyor bars, substantially as described.

30. In combination with a rotary reel of a stone picking machine having stone lifting arms spaced apart from each other, a frame in which said reel is mounted, conveyor bars having portions located above, in rear of, and below the axis of the reel, said conveyor bars being spaced apart to receive the stone lifting arms between them, the lower portions of said bars being spaced more widely apart than the upper portions thereof, a rake in rear of the reel to lift the stones into the path of said lifting arms, and means for supporting the conveyor bars on the frame only at their front portions, leaving the rear portions of said bars nearest the rake teeth free to yield vertically, the upper more closely spaced portions of the conveyor bars supporting the stones while being propelled by said lifting arms towards the front supported portions of said bars, substantially as described.

OTIS F. REITER.